United States Patent [19]

Kuze et al.

[11] Patent Number: 4,604,453

[45] Date of Patent: Aug. 5, 1986

[54] POLYESTER COMPOSITION

[75] Inventors: Katsuaki Kuze; Yuziro Matsuyama; Yoshio Yamaoka; Ryuichi Murashige, all of Otsu; Osamu Makimura, Ohgaki, all of Japan

[73] Assignee: Toyo Boseki Kabushiki Kaisha, Osaka, Japan

[21] Appl. No.: 714,996

[22] Filed: Mar. 22, 1985

[30] Foreign Application Priority Data

Mar. 22, 1984 [JP] Japan .................................. 59-055836
Apr. 27, 1984 [JP] Japan .................................. 59-087057
Jun. 13, 1984 [JP] Japan .................................. 59-121525
Feb. 15, 1985 [JP] Japan .................................. 60-028898

[51] Int. Cl.$^4$ ............................................. C08G 63/70
[52] U.S. Cl. .................................... 528/481; 528/275; 528/276; 528/279; 528/280; 528/286
[58] Field of Search ............... 528/275, 276, 279, 280, 528/286, 481

[56] References Cited

U.S. PATENT DOCUMENTS 2,921,051  1/1960  Amborski et al. ............ 528/276 X
3,796,691  3/1974  Chimura et al. ................ 528/302
4,008,207  2/1977  Omoto et al. ................... 528/275
4,440,924  4/1984  Kuze et al. ..................... 528/275
4,454,312  6/1984  Kuze et al. ..................... 528/275

Primary Examiner—Lucille M. Phynes
Attorney, Agent, or Firm—Birch, Stewart, Kolasch & Birch

[57] ABSTRACT

A polyester having an initial accumulation electric charge of not less than 2.9 $\mu c/mm^2$ when determined in a melt state according to the method as hereinabove defined and a heat resistance of not more than 0.210 when determined according to the method as hereinabove defined, which comprises at least one magnesium compound and at least one phosphorus compound solubilized therein in amounts as satisfying the following formulas:

$$30 \leq [Mg] \leq 400 \qquad (1)$$

$$0.8 \leq Mg/P \leq 3 \qquad (2)$$

wherein [Mg] is the content (ppm) of the magnesium compound in terms of magnesium atom to the polyester and Mg/P is the atomic ratio of the magnesium atom in the magnesium compound to the phosphorus atom in the phosphorus compound.

15 Claims, 2 Drawing Figures

FIG. 1

FIG. 2

POLYESTER COMPOSITION

The present invention relates to a polyester composition. More particularly, it relates to a composition of a polyester comprising units of ethylene terephthalate as the major repeating units and being highly improved in various physical properties such as electrostatic adherence, transparency and heat resistance.

Saturated linear polyesters such as polyethylene terephthalate are useful as packing materials, photographic films, electric insulating materials, magnetic tapes, etc. owing to their excellent properties in mechanical strength, heat resistance, weather resistance, electric insulation, chemical resistance, etc. Usually, polyester films are prepared by melt extrusion of a polyester, followed by biaxially stretching.

Of the various qualities required for polyester films, uniformity in thickness is particularly important. On the other hand, the productivity of polyester films directly depends upon the casting speed. Thus, it is also important to attain a high casting speed. In order to assure uniformity in thickness and enhance the casting speed, it is necessary to attain the quick quenching of a melt extruded sheet from an extrusion orifice on a rotating quenching drum with intimate contact between the melt extruded sheet and the surface of the quenching drum. Such intimate contact owing to static electricity may be achieved by increasing the electric charge at the surface of the melt extruded sheet.

Japanese Patent Publication (examined) No. 40231/78 teaches that maintaining the specific resistance of a polyester in a melt state at a lower level is effective for increasing the electric charge at the surface of the melt extruded sheet made of the polyester. In fact, the electrostatic adherence is increased with the decrease of the specific resistance, but increase is significant only up to a maximum casting speed of about 50 m/minute. When the maximum casting speed is over such limit, increase is small. In other words, enhancement of the electrostatic adherence cannot be satisfactorily achieved when the maximum casting speed is about 50 m/minute or higher.

As a result of extensive study, it has been found that when the initial accumulation of electric charge (i.e. the accumulated electric charge at the initial stage) of a polyester in a melt state as measured according to the procedure as hereinafter explained exceeds a certain specific value, the electrostatic adherence of a melt extruded sheet made of the polyester is significantly improved, particularly when the maximum casting speed is about 50 m/minute or more. It has also been found that the incorporation of a magnesium compound and a phosphorus compound optionally with a certain metal compound(s) into a polyester in certain specific amounts is effective in making the initial accumulation electric charge to be higher than the certain specific value. It has further been found that such incorporation can also assure the production of a polyester having excellent heat resistance and good transparency.

Figure 1:
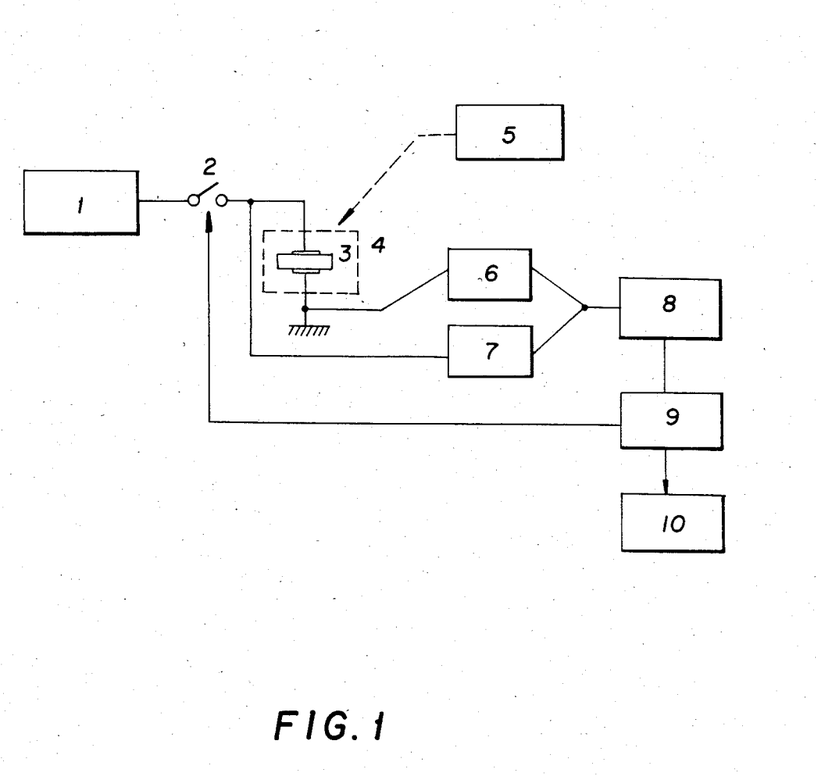

In this specification, the term "initial accumulation electric charge" is intended to mean a value determined by the procedure as hereinafter explained with reference to FIG. 1 of the accompanying drawings which shows the block diagram of a measuring apparatus: the test sample (3) of a polyester is sandwiched between two electrodes positioned at a distance of 1 cm in parallel and placed in a constant temperature chamber (4) maintained at 275° C. by the aid of a temperature controller (5). An electric voltage of 1,200 V is applied to the test sample from a high electric voltage source (1) through a switch circuit (2), which is opened or closed depending upon the signal from a data treating device (9), for a period of 3 minutes. The resulting voltage and current are respectively detected by the voltage detecting circuit (7) and the current detecting circuit (6), converted into a digital value by the aid of an A/D converter (8) and recorded as a data in a data output device (10) by the data treating device (9).

Figure 2:
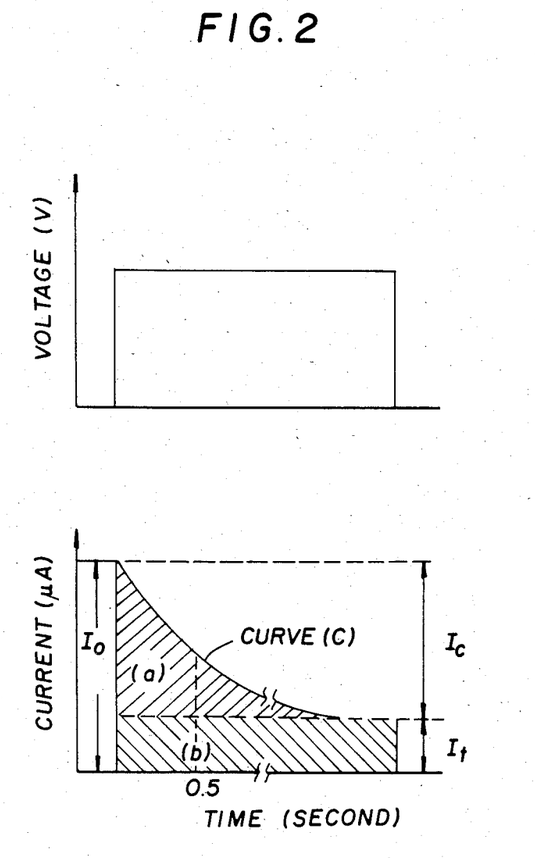

By plotting the variation of the current ($\mu$A) with time (second) on a graph, there is obtainable a curve (C) (as an example) as shown in FIG. 2 is obtained. In FIG. 2, $I_o$, $I_c$ and $I_t$ indicate respectively the initial (or original) current, the charging current and the transmitting current. The hatched areas (a) and (b) correspond respectively to the electric charge as accumulated at the electrode interface and the electric charge as lost at the electrodes. The hatched area (a) for the initial period of 0.5 seconds is calculated from the graph. The obtained value ($\mu$c) is divided by the area of the electrodes ($mm^2$), and the resultant value ($\mu c/mm^2$) is taken as the initial accumulation electric charge.

According to the present invention, there is provided a composition of a polyester having an initial accumulation electric charge of not less than 2.9 $\mu c/mm^2$, particularly of not less than 3.3 $\mu c/mm^2$, and more particularly of not less than 4.1 $\mu c/mm^2$, when determined in a melt state by the procedure as defined above. When the initial accumulation electric charge is less than 2.9 $\mu c/mm^2$, it cannot be expected to impart high electric adherence to the polyester, especially under a high casting speed.

Preferably, the polyester has a heat resistance of not more than 0.210, particularly of not and more than 0.190, more particularly of not more than 0.170. More preferably, the polyester has a good transparency.

As a first embodiment, the polyester of the present invention may comprise at least one magnesium compound and at least one phosphorus compound solubilized therein in amounts satisfying the following formulas:

$$30 \leq [Mg] \leq 400 \qquad (1)$$

$$0.8 \leq Mg/P \leq 3 \qquad (2)$$

wherein [Mg] is the content (ppm) of the magnesium compound in terms of magnesium atoms to the polyester and Mg/P is the atomic ratio of the magnesium atoms in the magnesium compound to the phosphorus atoms in the phosphorus compound.

As a second embodiment, the polyester may additionally comprise at least one alkali metal compound solubilized therein, the alkali metal atoms in the alkali metal compound being chosen from sodium atoms and potassium atoms, in an amount satisfying the following formula:

$$3 \leq [M_1] \leq 50 \qquad (3)$$

wherein [$M_1$] is the content (ppm) of the alkali metal compound in terms of alkali metal atom to the polyester.

As a third embodiment, the polyester may alternatively or additionally comprise at least one cobalt compound and at least one phosphorus compound solubilized therein in amounts satisfying the following formulas:

$$3.0 \leq [Co] \leq 50 \quad (4)$$

$$0.8 \leq (Mg+Co)/P \leq 3 \quad (5)$$

wherein [Co] is the content (ppm) of the cobalt compound in terms of cobalt atoms to the polyester and (Mg+Co)/P is the atomic ratio of the magnesium atoms in the magnesium compound plus the cobalt atoms in the cobalt compound to the phosphorus atoms in the phosphorus compound.

As a fourth embodiment, the polyester may alternatively or additionally comprise at least one alkaline earth metal compound and at least one phosphorus compound solubilized therein, the alkaline earth metal atom in the alkaline earth metal compound being chosen from calcium atom, strontium atom and barium atom, in amounts satisfying the following formulas:

$$30 \leq [Mg]+[M_2] \leq 400 \quad (6)$$

$$2 \leq Mg/M_2 \leq 100 \quad (7)$$

$$0.8 \leq (Mg+M_2)/P \leq 3 \quad (8)$$

wherein [Mg] is the content (ppm) of the magnesium compound in terms of magnesium atoms to the polyester and [$M_2$] is the content (ppm) of the alkaline earth metal compound in terms of alkaline earth metal atoms to the polyester, $Mg/M_2$ is the atomic ratio of the magnesium atoms in the magnesium compound to the alkaline earth metal atoms in the alkaline earth metal compound and $(Mg+M_2)/P$ is the atomic ratio of the magnesium atoms in the magnesium compound plus the alkaline earth metal atoms in the alkaline earth metal compound to the phosphorus atoms in the phosphorus compound.

As a fifth embodiment, the polyester may comprise alternatively or additionally at least one cobalt compound and at least one phosphorus compound solubilized therein in amounts satisfying the following formulas:

$$3.0 \leq [Co] \leq 50 \quad (9)$$

$$0.8 \leq (Mg+M_2+Co)/P \leq 3 \quad (10)$$

wherein [Co] is the content (ppm) of the cobalt compound in terms of cobalt atoms to the polyester and $(Mg+M_2+Co)/P$ is the atomic ratio of the magnesium atoms in the magnesium compound plus the alkaline earth metal atoms in the alkaline earth metal compounds plus the cobalt atoms in the cobalt compound to the phosphorus atoms in the phosphorus compound.

As a sixth embodiment, the polyester may comprise at least one zirconium compound and at least one phosphorus compound solubilized therein in amounts satisfying the following formulas:

$$3.0 \leq [Zr] \leq 19 \quad (11)$$

$$0.8 \leq (Mg+Zr)/P \leq 3 \quad (12)$$

wherein [Zr] is the content (ppm) of the zirconium compound in terms of zirconium atoms to the polyester and (Mg+Zr)/P is the atomic ratio of the magnesium atoms in the magnesium compounds plus the zirconium atoms in the zirconium compound to the phosphorus atoms in the phosphorus compound.

As a seventh embodiment, the polyester may comprise alternatively or additionally at least one zirconium compound and at least one phosphorus compound solubilized therein in amounts satisfying the following formulas:

$$3.0 \leq [Zr] \leq 19 \quad (13)$$

$$0.8 \leq (Mg+Co+Zr)/P \leq 3 \quad (14)$$

wherein [Zr] is the content (ppm) of the zirconium compound in terms of zirconium atoms to the polyester and (Mg+Co+Zr)/P is the atomic ratio of the magnesium atoms in the magnesium compound plus the cobalt atoms in the cobalt compound plus the zirconium atoms in the zirconium compound to the phosphorus atoms in the phosphorus compound.

As an eighth embodiment, the polyester may comprise alternatively or additionally at least one zirconium compound and at least one phosphorus compound solubilized therein in amounts satisfying the following formulas:

$$3.0 \leq [Zr] \leq 19 \quad (15)$$

$$0.8 \leq (Mg+M_2+Zr)/P \leq 3 \quad (16)$$

wherein [Zr] is the content (ppm) of the zirconium compound in terms of zirconium atoms to the polyester and $(Mg+M_2+Zr)/P$ is the atomic ratio of the magnesium atoms in the magnesium compound plus the alkaline earth metal atoms in the alkaline earth metal compound plus the zirconium atoms in the zirconium compound to the phosphorus atoms in the phosphorus compound.

As a ninth embodiment, the polyester may comprise alternatively or additionally at least one zirconium compound and at least one phosphorus compound solubilized therein in amounts satisfying the following formulas:

$$3.0 \leq [Zr] \leq 19 \quad (17)$$

$$0.8 \leq (Mg+M_2+Co+Zr)/P \leq 3 \quad (18)$$

wherein [Zr] is the content (ppm) of the zirconium compound in terms of zirconium atoms to the polyester and $(Mg+M_2+Co+Zr)/P$ is the atomic ratio of the magnesium atoms in the magnesium compound plus the alkaline earth metal atoms in the alkaline earth metal compound plus the cobalt atoms in the cobalt compound plus the zirconium atoms in the zirconium compound to the phosphorus atoms in the phosphorus compound.

As a tenth embodiment, the polyester may comprise alternatively or additionally at least one metal compound and at least one phosphorus compound solubilized therein, the metal atom in the metal compound being chosen from manganese and zinc, in amounts satisfying the following formulas:

$$30 \leq [Mg]+[M_3] \leq 400 \quad (19)$$

$$2 \leq Mg/M_3 \leq 100 \quad (20)$$

$$0.8 \leq (Mg+M_3)/P \leq 3 \quad (21)$$

wherein [Mg] is the content (ppm) of the magnesium compound in terms of magnesium atoms to the polyester and [M$_3$] is the content (ppm) of the metal compound in terms of metal atoms to the polyester, Mg/M$_3$ is the atomic ratio of the magnesium atoms in the magnesium compound to the metal atoms in the metal compound and (Mg+M$_3$)/P is the atomic ratio of the magnesium atoms in the magnesium compound plus the metal atoms in the metal compound to the phosphorus atoms in the phosphorus compound.

As an eleventh embodiment, the polyester may comprise alternatively or additionally at least one metal compound and at least one phosphorus compound solubilized therein, the metal atom in the metal compound being chosen from manganese and zinc, in amounts satisfying the following formulas:

$$30 \leq [Mg] + [M_3] \leq 400 \quad (22)$$

$$2 \leq Mg/M_3 \leq 100 \quad (23)$$

$$0.8 \leq (Mg + Co + M_3)/P \leq 3 \quad (24)$$

wherein [Mg] is the content (ppm) of the magnesium compound in terms of magnesium atoms to the polyester and [M$_3$] is the content (ppm) of the metal compound in terms of metal atoms to the polyester, Mg/M$_3$ is the atomic ratio of the magnesium atoms in the magnesium compound to the metal atoms in the metal compound and (Mg+Co+M$_3$)/P is the atomic ratio of the magnesium atoms in the magnesium compound plus the cobalt atom in the cobalt compound plus the metal atoms in the metal compound to the phosphorus atoms in the phosphorus compound.

As a twelfth embodiment, the polyester may comprise alternatively or additionally at least one metal compound and at least one phosphorus compound solubilized therein, the metal atoms in the metal compound being chosen from manganese and zinc, in amounts satisfying the following formulas:

$$30 \leq [Mg] + [M_2] + [M_3] \leq 400 \quad (25)$$

$$.2 \leq Mg/M_3 \leq 100 \quad (26)$$

$$0.8 \leq (Mg + M_2 + M_3)/P \leq 3 \quad (27)$$

wherein [Mg] is the content (ppm) of the magnesium compound in terms of magnesium atoms to the polyester, [M$_2$] is the content (ppm) of the alkaline earth metal compound in terms of alkaline earth metal atoms and [M$_3$] is the content (ppm) of the metal compound in terms of metal atoms, Mg/M$_3$ is the atomic ratio of the magnesium atoms in the magnesium compound to the metal atoms in the metal compound and (Mg+M$_2$+M$_3$)/P is the atomic ratio of the magnesium atoms in the magnesium compound plus the alkaline earth metal atoms in the alkaline earth metal compound plus the metal atoms in the metal compound to the phosphorus atoms in the phosphorus compound.

Still, it is favorable to incorporate the phosphorus compound into the reaction system two or more times during the production of the polyester.

The polyester of the present invention comprises units of ethylene terephthalate as the major repeating units. Thus, it may comprise not less than about 80 mol% of units of ethylene terephthalates. Other monomeric units which may be present in the polyester are units of dicarboxylic acids such as isophthalic acid, 2,6-naphthalenedicarboxylic acid, 4,4'-dicarboxydiphenyl, 4,4'-dicarboxybenzophenone, bis(4-carboxyphenyl)ethane, adipic acid, sebacic acid and 5-sodium sulfoisophthalic acid, units of diols such as propylene glycol, butanediol, neopentyl glycol, diethylene glycol, cyclohexanedimethanol and bisphenol A/ethylene oxide adduct, units of hydroxycarboxylic acids such as p-(beta-hydroxyethoxy)benzoic acid, etc. Monomeric units which form amide bonds, urethane bonds, ether bonds, carbonate bonds, etc. may be also included in the polyester.

The polyester of the present invention may be prepared by a per se conventional process, for instance, by supplying terephthalic acid and ethylene glycol continuously or intermittently to bis(beta-hydroxyethyl) terephthalate or its oligomer so as to carry out esterification under a pressure of not more than about 1.0 kg/cm$^2$, followed by polycondensation. The esterification and the polycondensation may be carried out by per se conventional procedures except for the incorporation of certain amounts of certain metal and phosphorus compounds as mentioned above into the reaction system at certain stages.

The esterification may be conducted batchwise or continuously. Usually, a continuous process using, for instance, 2 to 4 reaction vessels, is favorable, because the quality of the product is kept constant and the reaction can be readily controlled.

Bis(beta-hydroxyethyl) terephthalate or its oligomer to which terephthalic acid and ethylene glycol are supplied may be prepared by the direct esterification process or by any other process such as the ester exchange process.

The esterification may be carried out under any pressure of not more than about 1.0 kg/cm$^2$, preferably under atmospheric pressure. A pressure exceeding about 1.0 kg/cm$^2$ will unfavorably increase the by-production of diethylene glycol. The oligomer may be present in any amount in the reaction system at the initiation of the esterification, but its amount is preferred to be so controlled that the molar amount of the acid component in the oligomer at the initiation of the esterification is from about 1/5 to ½ of that at the end of the esterification.

Terephthalic acid and ethylene glycol are usually introduced into the reaction system as a slurry, because of easy handling and accurate measuring. In the slurry, the molar ratio of ethylene glycol and terephthalic acid is preferably about 1.05 to 2.0, particularly from about 1.10 to 1.30. When the molar ratio is less than about 1.05, handling of the slurry is difficult. When it is more than about 2.0, the by-production of diethylene glycol is increased. The slurry may be prepared by the use of any conventional mixing apparatus and supplied to the reaction system continuously or intermittently by the aid of a supply pump.

The esterification is usually carried out at a temperature between about 210° C. and 270° C. When the temperature is below about 210° C., the reaction period is longer, and the production becomes uneconomical. When the temperature is beyond about 270° C., the by-production of diethylene glycol and the coloration of the product are increased.

The polycondensation may be conducted batchwise or continuously. Suitable temperature for polycondensation is below 280° C. and preferably from 270° to 275° C. A higher temperature will increase the by-production of diethylene glycol.

For the esterification, a catalyst is usually not employed. The catalyst for polycondensation is not limited but preferably chosen from antimony compounds, germanium compounds and titanium compounds.

The esterification and/or the polycondensation may be carried out in the presence of a lubricant chosen from inorganic or organic fine particles.

The metal compounds to be incorporated into the reaction system according to the present invention may be those soluble in the reaction system. They may be used alone or in combination.

As the magnesium compounds, there may be used, for instance, magnesium hydride, magnesium oxide, magnesium alkanoates (e.g. magnesium acetate), magnesium alkoxides (e.g. magnesium methoxide), etc. As the alkaline metal compounds such as sodium compounds and potassium compounds, there may be employed their alkanoates, phosphates, carbonates, hydrides, alkoxides, etc. Their specific examples are sodium acetate, potassium acetate, sodium benzoate, potassium benzoate, sodium dihydrogen phosphate, potassium dihydrogen phosphate, sodium pyrophosphate, potassium pyrophosphate, sodium tripolyphosphate, potassium tripolyphosphate, sodium bicarbonate, potassium bicarbonate, sodium hydride, potassium hydride, sodium methoxide, potassium hydride, sodium methoxide, potassium methoxide, sodium ethoxide, potassium ethoxide, etc.

Examples of the cobalt compounds are cobalt alkanoates (e.g. cobalt acetate), cobalt naphthenate, cobalt benzoate, cobalt chloride, cobalt acetylacetonate, etc. Examples of the alkaline earth metal compounds are calcium compounds, strontium compounds and batrium compounds are their hydrides, hydroxides, alkanoates, alkoxides, etc. More specifically, there may be exemplified calcium hydride, strontium hydride, barium hydride, calcium hydroxide, strontium hydroxide, barium hydroxide, calcium acetate, strontium acetate, barium acetate, calcium methoxide, strontium methoxide, barium methoxide, etc. Examples of the zirconium compounds are zirconyl salts of organic acids (e.g. zirconyl acetate, zirconyl benzoate, zirconyl tartrate), zirconium alkoxides (e.g. tetra-n-propiozirconate, tetra-n-butylzirconate), etc. Examples of the manganese compounds and the zinc compounds are their organic acid salts, halides, alkoxides, acetylacetonates, etc. More specifically, there are exemplified manganese acetate, zinc acetate, manganese benzoate, zinc benzoate, manganese chloride, zinc chloride, manganese methoxide, zinc methoxide, manganese acetylacetonate, zinc acetylacetonate, etc.

As the phosphorus compounds, there may be used phosphoric acid, phosphorous acid, phosphonic acid, etc. Their derivatives are also usable. Specific examples are phosphoric acid, trimethyl phosphate, triethyl phosphate, tributyl phosphate, triphenyl phosphate, monomethyl phosphate, dimethyl phosphate, monobutyl phosphate, dibutyl phosphate, phosphorous acid, trimethyl phosphite, triethyl phosphite, tributyl phosphite, methylphosphonic acid, dimethyl methylphosphonate, dimethyl ethylphosphonate, dimethyl phenylphosphonate, diethyl phenylphosphonate, diphenyl phenylphosphonate, etc. These may be used alone or in combination. Among them, the use of the one chosen from phosphoric acid and phosphorous acid, and their derivatives is favorable.

When the metal compounds and the phosphorus compounds are used in the amounts as hereinabove defined, the polyester incorporated with them is provided with a high electrostatic adherence and also with an excellent heat resistance. For the attainment of satisfactory electrostatic adherence as well as sufficient heat resistance, the incorporation of the phosphorous compounds two or more times during production of the polyester is recommended.

When the mangesium compound is used without any other alkaline earth metal compound, its amount to be incorporated may be from about 30 to 400 ppm, preferably from about 50 to 300 ppm, in terms of magnesium atom (cf. the formula (1)). When the magnesium compound is used with any other alkaline earth metal compound, their combined amount may be from about 30 to 400 ppm, preferably from about 50 to 300 ppm, in terms of metal atoms (cf. the formula (4)). In the case of the amount being less than the lower limit, the increase of the electric charge accumulation is insufficient, and as the result, the electrostatic adherence is not satisfactorily improved. In the case of the amount being more than the upper limit, any further improvement of the electrostatic adherence is not expected. In addition, the by-production of diethylene glycol is increased and the heat resistance of the produced polyester is deteriorated.

When any other alkaline earth metal compound is used together with the magnesium compound, the atomic ratio of the magnesium atom in the magnesium compound to the alkaline earth metal atoms in the other alkaline earth metal compound is to be from 2 to 100, preferably from 5 to 50 (cf. the formula (7)). In the case of the atomic ratio being not within the above range, any significant improvement due to the combined use of those metals cannot be expected. In addition, particles are deposited in a greater amount during the production of the polyester so that a film manufactured from such polyester is lowered in transparency, when said atomic ratio is less than 2.

Addition of the magnesium compound and/or the other alkaline earth metal compounds to the reaction system may be carried out at an appropriate stage(s) before the termination of the initial condensation. The optimum addition stage is varied with the production process, the kinds of the compounds to be added, etc. In the case of the direct polymerization, for instance, the addition of the magnesium compound may be effected at the stage that the esterification rate reaches to about 20–80%, preferably about 50–70%. When the addition is carried out at the stage that the esterification rate is less than about 20%, the filtrability of the oligomer is lowered, and the insoluble abnormalities in the oligomer can be hardly eliminated. When the addition takes place at the stage when the esterification rate exceeds about 80%, the by-production of diethylene glycol is increased, and the quality of the polyester as produced is deteriorated. Further, the addition of any of the calcium compounds, the strontium compounds and the barium compounds is preferred to be effected prior to the termination of the esterification, because otherwise the production of the inner particles is increased so as to lower the transparency.

In the case of the ester exchange, the addition of the entire amount(s) of the magnesium compound and/or the other alkaline earth metal compounds prior to the completion of the reaction is to be avoided, because their catalytic activity is exerted strongly so that the control of the reaction becomes difficult. Thus, at least a portion(s) of the magnesium compound and/or the other alkaline earth metal compounds are to be added to the reaction system after the completion of the ester exchange.

Still, the termination of the initial condensation is intended to mean the stage where the intrinsic viscosity of the reaction system reaches about 0.2. After this stage, the viscosity of the reaction system is excessively high so that the uniform incorporation of the compounds to be added is difficult. In addition, the depolymerization of the oligomer may take place so that the productivity is lowered and the by-production of diethylene glycol occurs.

The alkali metal compound may be added to the reaction system to make a content of 3 to 50 ppm, especially of 5 to 30 ppm, in terms of alkali metal atom to the polyester (cf. the formula (3)). When addition is made at this level, high electrostatic adherence will be attained. In the case of the amount being less than the lower limit, the electrostatic adherence is lowered, and the by-production of diethylene glycol is increased. In the case of the amount being more than the upper limit, the electrostatic adherence is lowered, and also the increase of crude particles, the depression of heat resistance, the deterioration of resin color, etc. take place. Addition of the alkali metal compound may be carried out in the same manner as in the magnesium compound and/or the other alkaline earth metal compounds.

The cobalt compound may be added to the reaction system to make a content of 3 to 50 ppm, especially of 5 to 30 ppm, in terms of cobalt atoms to the polyester (cf. the formulas (4) and (9)). When addition is made at this level, high electrostatic adherence will be attained. Addition of the alkali metal compound may be carried out in the same manner as in the magnesium compound and/or the other alkaline earth metal compounds.

The zirconium compound may be added to the reaction system to make a content of 3 to 19 ppm, especially of 5 to 15 ppm, in terms of zirconium atoms to the polyester (cf. the formulas (11), (13), (15) and (17)). When addition is made at this level, high electrostatic adherence will be attained. Addition of the zirconium compound may be carried out in the same manner as in the magnesium compound and/or the other alkaline earth metal compounds.

The manganese compound and/or the zinc compound may be added to the reaction system in an amount(s) so that the atomic ratio of the magnesium atoms in the magnesium compound to the manganese and/or zinc atom(s) in the magnesium and/or zinc compound(s) is to be from 2 to 100, especially from 5 to 50, more especially from 10 to 30 (cf. the formulas (20), (23) and (24)). When addition is made at this level, high electrostatic adherence will be attained. Addition of the manganese and/or zinc compound(s) may be carried out in the same manner as in the magnesium compound and/or the other alkaline earth metal compounds.

The phosphorus compound may be added to the reaction system in an amount that the atomic ratio of the the alkaline earth metal atoms in the alkaline earth metal compound, the cobalt atoms in the coablt compound and/or the zirconium atoms in the zirconium compound to the phosphorus atoms in the phosphorus compound is from 0.8 to 3 (cf. the formulas (2), (5), (8), (10), (12), (14), (16), (18), (21), (24) and (27)). When addition is made at this level, high electrostatic adherence will be attained.

Addition of the phosphorus compound to the reaction system is preferably carried out two or more times, particularly two times. By such addition the enhancement of the electrostatic adherence is made remarkable. When any of the calcium compound, the strontium compound, the barium compound, the zirconium compound, the manganese compound and the zinc compound is not used, this effect is particularly remarkable. The addition may be performed at different times in the case of the batchwise process or at different places in the case of the continuous process. When the divided addition is made the amount at the first addition may be not more than 50% by weight, preferably not more than 30% by weight of the total amount. The first addition may be effected at any stage, i.e. before, simultaneously and/or after the addition of the magnesium compound. It may be also done before or after the termination of the esterification and the ester exchange. The second and subsequent additions may be preferably carried out after the addition of the magnesium compound. It is also preferred to be conducted after the completion of the esterification and the ester exchange.

The essential and optional additives as stated above may be introduced into the reaction system alone or in combination. Further, their introduction is usually carried out in a solid or liquid form, and particularly preferred is to introduce them as a solution in ethylene glycol.

The polyesters obtained by the present invention have excellent electrostatic adherence, heat resistance and transparency and therefore they are suitable for use as films, containers, etc.

For better understanding the present invention, detailed descriptions will be given by means of the following Examples, wherein part(s) are by weight unless otherwise stated.

The physical properties described in the Examples were determined by the following methods:

(1) Esterification rate:

The amount of the carboxyl group remaining in the reaction product and the saponification value of the reaction product were measured, and the esterification rate was calculated according to the following equation:

Esterification rate (%) =

$$\frac{\text{(Saponification value)} - \text{(Amount of carboxyl group)}}{\text{Saponification value}} \times 100$$

(2) Intrinsic viscosity:

Measurement was made on a solution of the polymer in a mixed solvent of phenol and tetrachloroethane (6:4 by weight) at 30° C.

(3) Specific resistance of the polymer in a melt state:

Two electrode plates were immersed in the polymer in a melt state at 275° C., and an electric voltage of 120 V was supplied thereto. The electric current ($i_o$) was measured, and the specific resistance ($\rho_i$) was calculated according to the following equation:

$$\rho_i(\Omega \cdot cm) = \frac{A}{l} \times \frac{V}{i_o}$$

wherein A is the area of the electrode plates (cm$^2$), l is the distance between the electrode plates (cm) and V is the electric voltage (V).

(4) Electrostatic adherence:

An electrode of tungsten wire was provided between the orifice of an extruder and the quenching drum, and an electric voltage of 10 to 15 V was supplied between the electrode and the quenching drum, during which casting was conducted. The surface of the resultant casting sheet was subjected to observation by naked eye. Evaluation was made on the casting speed (m/min) at which the occurrence of pinner bubble started. The polymer giving a larger casting speed is taken as better in electrostatic adherence.

(5) Film haze:

The film haze (%) was determined by the use of a direct vision hazeometer (manufactured by Toyo Seiki K.K.).

(6) Heat resistance:

The polymer was admitted in a glass ampoule under a nitrogen pressure of 100 mmHg, and the glass ampoule was sealed. After heating at 300° C. for 2 hours, the change in the intrinsic viscosity was measured. The heat resistance was expressed by the depression in intrinsic viscosity ($\Delta IV$). A smaller value of $\Delta IV$ represents a better heat resistance.

(7) Quantitative determination of metals and phosphorus solubilized in the polymer:

The polymer (500 mg) was dissolved in hexafluoropropanol (10 ml) and filtered through a membrane filter made of nitrocellulose ($0.1\mu$) under pressure. The filtrate (100 ml) was poured into ethanol (100 ml) to precipitate the polymer. The amounts of the metals as well as the phosphorus in the precipitated polymer was quantitatively determined by the plasma emission method.

EXAMPLE 1

A continuous esterification apparatus comprising a first reactor equipped with an agitator, a condenser, inlets for charging and an outlet for discharging and a second reactor divided into two reaction chambers each equipped with an agitator, a condenser, inlets for charging and an outlet discharging, the first reactor and the second reactor being connected in series, was used.

To the reaction mixture containing the esterification product in the first reactor, a slurry of terephthalic acid in ethylene glycol (the molar ratio of ethylene glycol to terephthalic acid being 1.7) was supplied continuously. At the same time, a solution of magnesium acetate tetrahydrate in ethylene glycol and a solution of sodium acetate in ethylene glycol were continuously supplied thereto through different inlets than that for the terephthalic acid slurry to make the contents of 100 ppm in terms of magnesium atoms and of 10 ppm in terms of sodium atoms to the polyester in the reaction mixture passing through the first reactor, and the reaction was effected at 255° C. under atmospheric pressure with an average residence time of 4.5 hours. The reaction mixture was discharged continuously from the first reactor through the outlet and supplied to the first reaction chamber of the second reactor through an inlet. The reaction mixture was then overflowed from the first reaction chamber to the second reaction chamber.

To the first reaction chamber, ethylene glycol, a solution of antimony trioxide in ethylene glycol and a solution of trimethyl phosphate in ethylene glycol were supplied continuously in amounts of 0.9 part by weight to 100 parts by weight of the polyester in the reaction mixture passing through the first reaction chamber and of 250 ppm in terms of antimony atoms and of 25 ppm in terms of phosphorus atoms to the polyester in the reaction mixture passing through the first reaction chamber. To the second reaction chamber, a solution of trimethyl phosphate in ethylene glycol was supplied continuously in an amount of 80 ppm in terms of phosphorus atoms to the polyester in the reaction mixture passing through the second reaction chamber. The reaction was carried out in each of the first and second reaction chambers at 260° C. under atmospheric pressure with an average residence time of 2.5 hours.

The esterification rates in the first reactor and in the second reactor were respectively 70% and 98%.

The esterification product was continuously passed through a stainless steel net filter of 400 mesh and supplied into a polycondensation apparatus comprising two reactors connected in series, each reactor being equipped with an agitator, a condenser, an inlet for charging and an outlet for discharging. The polycondensation was conducted to give a polyester of 0.620 in intrinsic viscosity.

The properties of the polyester thus obtained and the film of 12 microns in thickness prepared by melt extruding the polyester at 290° C., stretching the extruded sheet stepwise at 90° C. in machine direction with a draw ratio of 3.5 and at 130° C. in transverse direction with a draw ratio of 3.5 and subjecting the stretched sheet to heat treatment at 220° C. are shown in Table 1.

The polyester obtained in this Example had excellent electrostatic adherence, transparency and heat resistance.

COMPARATIVE EXAMPLE 1

In the same manner as in Example 1 but not using magnesium acetate tetrahydrate, sodium acetate and trimethyl phosphate, the operation was carried out to give a polyester. The properties of the polyester thus obtained and the film of 12 microns in thickness prepared from such polyeter by melt extrusion, stretching and heat treatment as in Example 1 are shown in Table 1.

The polyester obtained in this Comparative Example was very poor in electrostatic adherence.

COMPARATIVE EXAMPLE 2

In the same manner as in Example 1 but adding the entire amount of trimethyl phosphate to the reaction mixture in the second reaction chamber of the second reactor (i.e. not adding trimethyl phosphate to the reaction mixture in the first reaction chamber of the second reactor), the operation was carried out to give a polyester. The properties of the polyester thus obtained and the film of 12 microns in thickness prepared from such polyeter by melt extrusion, stretching and heat treatment as in Example 1 are shown in Table 1.

The polyester obtained in this Comparative Example was inferior to that obtained in Example 1 in electrostatic adherence.

COMPARATIVE EXAMPLE 3

In the same manner as in Comparative Example 1 but decreasing the amount of trimethyl phosphate from 105 ppm to 84 ppm, the operation was carried out to give a polyester. The properties of the polyester thus obtained and the film of 12 microns in thickness prepared from such polyester by melt extrusion, stretching and heat treatment as in Example 1 are shown in Table 1.

The polyester obtained in this Comparative Example showed a high electrostatic adherence of the same level as in Example 1 but was much inferior in heat resistance.

EXAMPLE 2

In the same manner as in Example 1 but using magnesium acetate tetrahydrate and cobalt acetate tetrahydrate as the metal compounds, the operation was carried out to give a polyester. The properties of the polyester thus obtained and the film of 12 microns in thickness prepared from such polyester by melt extrusion, stretching and heat treatment as in Example 1 are shown in Table 1.

The polyester obtained in this Example had excellent physical properties.

COMPARATIVE EXAMPLE 4

In the same manner as in Example 2 but adding the entire amount of trimethyl phosphate to the reaction mixture in the second reaction chamber of the second reactor (i.e. not adding the ethylene glycol solution of trimethyl phosphate to the reaction mixture in the first reaction chamber of the second reactor), the operation was carried out to give a polyester. The properties of the polyester thus obtained and the film of 12 microns in thickness prepared from such polyeter by melt extrusion, stretching and heat treatment as in Example 1 are shown in Table 1.

The polyester obtained in this Comparative Example was inferior to that obtained in Example 2 in electrostatic adherence.

COMPARATIVE EXAMPLE 5

In the same manner as in Example 2 but not using trimethyl phosphate, the operation was carried out to give a polyester. The properties of the polyester thus obtained and the film of 12 microns in thickness prepared from such polyeter by melt extrusion, stretching and heat treatment as in Example 1 are shown in Table 1.

The polyester obtained in this Comparative Example was much inferior to that obtained in Example 2 in electrostatic adherence and heat resistance.

EXAMPLE 3

In the same manner as in Example 1 but using magnesium acetate tetrahydrate and cobalt acetate tetrahydrate as the metal compounds and triethyl phosphate as the phosphorus compound, the operation was carried out to give a polyester. The properties of the polyester thus obtained and the film of 12 microns in thickness prepared from such polyester by melt extrusion, stretching and heat treatment as in Example 1 are shown in Table 1.

The polyester obtained in this Example had excellent physical properties.

EXAMPLE 4

In the same manner as in Example 1 but using magnesium acetate tetrahydrate, calcium acetate monohydrate and sodium acetate as the metal compounds, the operation was carried out to give a polyester. The properties of the polyester thus obtained and the film of 12 microns in thickness prepared from such polyester by melt extrusion, stretching and heat treatment as in Example 1 are shown in Table 1.

The polyester obtained in this Example had excellent physical properties.

COMPARATIVE EXAMPLE 6

In the same manner as in Example 4 but increasing the amount of trimethyl phosphate to 3.2 times, the operation was carried out to give a polyester. The properties of the polyester thus obtained and the film of 12 microns in thickness prepared from such polyeter by melt extrusion, stretching and heat treatment as in Example 1 are shown in Table 1.

The polyester obtained in this Comparative Example was inferior to that obtained in Example 4 in electrostatic adherence.

EXAMPLES 5 TO 16

In the same manner as in Example 1 but using various metal compounds and various phosphorus compounds, the operation was carried out to give polyesters. The properties of the polyesters thus obtained and the films of 12 microns in thickness prepared from such polyesters by melt extrusion, stretching and heat treatment as in Example 1 are shown in Table 1.

The polyesters obtained in these Examples had excellent physical properties.

TABLE 1

| Example | Metal compound Name | Amount added (ppm) | Stage added*1 | Content*2 (ppm) | Phosphorus compound Name | Amount added (ppm) | Stage added*1 | Content*2 (ppm) | Metal/P (atomic ratio) | Accumulated electric charge at initial stage (μc/mm²) | Electrostatic adherence (maximum casting speed) (m/min) | Heat-resistance (ΔIV) | Film haze (%) |
|---|---|---|---|---|---|---|---|---|---|---|---|---|---|
| 1 | Magnesium acetate | 100 | } A | 98 | Trimethyl phosphate | 25 | B/1st chamber | 82 | 1.52 | 3.28 | 53 | 0.159 | 0.1 |
|  | Sodium acetate | 10 |  | 10 | Trimethyl phosphate | 80 | B/2nd chamber |  |  |  |  |  |  |
| Comparative 1 | — | — | — | — | — | — | — | — | — | — | <30 | 0.122 | 0.1 |
| Comparative 2 | Magnesium acetate | 100 | } A | 98 | Trimethyl phosphate | 105 | B/2nd chamber | 82 | 1.52 | 1.32 | 40 | 0.158 | 0.1 |
|  | Sodium acetate | 10 |  | 9 |  |  |  |  |  |  |  |  |  |
| Comparative 3 | Magnesium acetate | 100 | } A | 99 | Trimethyl phosphate | 84 | B | 65 | 1.94 | 2.12 | 53 | 0.253 | 0.2 |
|  | Sodium acetate | 10 |  | 9 |  |  |  |  |  |  |  |  |  |
| 2 | Magnesium acetate | 120 | A | 117 | Trimethyl phosphate | 41 | B/1st chamber | 110 | 1.49 | 3.20 | 57 | 0.158 | 0.1 |
|  | Cobalt acetate | 30 | B/2nd chamber | 28 | Trimethyl phosphate | 99 | B/2nd chamber |  |  |  |  |  |  |
| Comparative 4 | Magnesium acetate | 120 | A | 119 | Trimethyl phosphate | 140 | B/1st chamber | 108 | 1.54 | 3.75 | 42 | 0.145 | 0.1 |
|  | Cobalt acetate | 30 | B/2nd chamber | 28 |  |  |  |  |  |  |  |  |  |
| Comparative 5 | Magnesium acetate | 120 | B/2nd chamber | 115 | — | — | — | 0 | ∞ | 2.12 | 45 | 0.321 | 0.2 |
|  | Cobalt acetate | 30 |  | 27 |  |  |  |  |  |  |  |  |  |
| 3 | Magnesium acetate | 100 | A | 100 | Triethyl phosphate | 25 | A | 85 | 1.58 | 2.48 | 72 | 0.165 | 0.2 |
|  | Cobalt acetate | 15 |  | 14 | Triethyl phosphate | 81 | B/1st chamber |  |  |  |  |  |  |
| 4 | Magnesium acetate | 5 | B/2nd chamber | 5 | Trimethyl phosphate | 25 | A | 87 | 1.68 | 6.60 | 75 | 0.162 | 0.1 |
|  | Sodium acetate | 100 | A | 98 | Trimethyl phosphate | 93 | B/1st chamber |  |  |  |  |  |  |
|  | Cobalt acetate | 5 |  | 5 |  |  |  |  |  |  |  |  |  |
| Comparative 6 | Magnesium acetate | 30 | B/2nd chamber | 28 | Trimethyl phosphate | 80 | A | 302 | 0.49 | 7.55 | <30 | 0.120 | 0.1 |
|  | Calcium acetate | 100 | A | 100 |  |  |  |  |  |  |  |  |  |
| 5 | Magnesium acetate | 5 | B/2nd chamber | 5 | Trimethyl phosphate | 298 | A | 154 | 1.12 | 6.65 | 72 | 0.150 | 0.1 |
|  | Calcium acetate | 30 |  | 28 | Trimethyl phospate | 49 | B/1st chamber |  |  |  |  |  |  |
|  | Magnesium acetate | 150 | B/1st chamber | 145 |  |  |  |  |  |  |  |  |  |

TABLE 1-continued

| Example | Metal compound | | | | Phosphorus compound | | | | Metal/P (atomic ratio) | Accumulated electric charge at initial stage (μc/mm²) | Electrostatic adherence (maximum casting speed) (m/min) | Heat-resistance (ΔIV) | Film haze (%) |
|---|---|---|---|---|---|---|---|---|---|---|---|---|---|
| | Name | Amount added (ppm) | Stage added*1 | Content*2 (ppm) | Name | Amount added (ppm) | Stage added*1 | Content*2 (ppm) | | | | | |
| | Sodium acetate | 20 | B/2nd chamber | 18 | Trimethyl phosphate | 145 | B/2nd chamber | 145 | | | | | |
| | Strontium acetate | 30 | | 28 | | | | | | | | | |
| 6 | Magnesium acetate | 150 | B/1st chamber | 148 | Triethyl phosphate | 48 | A | 145 | 1.34 | 6.50 | 72 | 0.148 | 0.1 |
| | Sodium acetate | 20 | B/2nd chamber | 19 | Triethyl phosphate | 143 | B/2nd chamber | 155 | 1.28 | 6.80 | 73 | 0.131 | 0.1 |
| | Calcium acetate | 30 | | 25 | | | | | | | | | |
| 7 | Magnesium acetate | 100 | A | 148 | Phosphoric acid | 22 | A | 100 | 1.44 | 6.55 | 72 | 0.119 | 0.1 |
| | Potassium acetate | 15 | | 15 | | | | | | | | | |
| | Calcium acetate | 20 | B/2nd chamber | 18 | Phosphoric acid | 142 | B/2nd chamber | | | | | | |
| 8 | Magnesium acetate | 100 | A | 90 | Trimethyl phosphate | 46 | B/1st chamber | 104 | 1.49 | 3.50 | 55 | 0.150 | 0.1 |
| | Cobalt acetate | 20 | | 20 | | | | | | | | | |
| | Calcium acetate | 10 | B/2nd chamber | 9 | Trimethyl phosphate | 84 | B/2nd chamber | 82 | 1.60 | 6.05 | 70 | 0.162 | 0.1 |
| | Sodium acetate | 5 | | 5 | | | | | | | | | |
| 9 | Magnesium acetate | 120 | A | 118 | Trimethyl phosphate | 39 | B/1st chamber | 104 | 1.37 | 6.53 | 72 | 0.139 | 0.1 |
| | Zirconium acetate | 15 | B/2nd chamber | 13 | Trimethyl phosphate | 93 | B/2nd chamber | | | | | | |
| 10 | Magnesium acetate | 100 | A | 99 | Triethyl phosphate | 25 | A | 83 | 1.65 | 6.65 | 73 | 0.157 | 0.1 |
| | Zirconyl acetate | 15 | | 14 | | | | | | | | | |
| 11 | Magnesium acetate | 100 | A | 97 | Triethyl phosphate | 80 | B/2nd chamber | | | | | | |
| | Sodium acetate | 30 | B/1st chamber | 27 | Trimethyl phosphate | 48 | B/1st chamber | | | | | | |
| | Calcium acetate | 20 | B/2nd chamber | 18 | Trimethyl phosphate | 86 | B/2nd chamber | | | | | | |
| | Sodium acetate | 5 | | 5 | | | | | | | | | |
| 12 | Magnesium acetate | 100 | A | 98 | Triethyl phosphate | 20 | A | | | | | | |
| | Zirconium acetate | 15 | | 15 | | | | | | | | | |
| | Cobalt acetate | 15 | B/1st | 14 | Triethyl phosphate | 84 | B/2nd chamber | | | | | | |

TABLE 1-continued

| Example | Metal compound | | | | Phosphorus compound | | | | | Metal/P (atomic ratio) | Accumulated electric charge at initial stage (μc/mm²) | Electrostatic adherence (maximum casting speed) (m/min) | Heat-resistance (ΔIV) | Film haze (%) |
|---|---|---|---|---|---|---|---|---|---|---|---|---|---|---|
| | Name | Amount added (ppm) | Stage added*1 | Content*2 (ppm) | Name | Amount added (ppm) | Stage added*1 | Content*2 (ppm) | | | | | | |
| | Sodium acetate | 5 | chamber | 13 | | | | | | | | | | |
| 13 | Magnesium acetate | 150 | ⎫ A | 149 | Trimethyl phosphate | 49 | B/1st chamber | 154 | | 1.32 | 6.50 | 72 | 0.152 | 0.1 |
| | Manganese acetate | 25 | ⎬ | 23 | | | | | | | | | | |
| | Potassium acetate | 15 | ⎭ | 13 | | | | | | | | | | |
| 14 | Magnesium acetate | 100 | ⎫ A | 100 | Trimethyl phosphate | 144 | B/2nd chamber | 108 | | 1.39 | 6.48 | 72 | 0.152 | 0.1 |
| | Manganese acetate | 15 | ⎬ | 13 | Trimethyl phosphate | 48 | B/1st chamber | | | | | | | |
| | Calcium acetate | 20 | ⎭ B/2nd chamber | 20 | Trimethyl phosphate | 86 | B/2nd chamber | | | | | | | |
| | Sodium acetate | 5 | | 4 | | | | | | | | | | |
| 15 | Magnesium acetate | 100 | ⎫ A | 97 | Trimethyl phosphate | 45 | B/1st chamber | 102 | | 1.37 | 6.45 | 71 | 0.150 | 0.1 |
| | Zinc acetate | 20 | ⎬ | 20 | Trimethyl phosphate | 83 | B/2nd chamber | | | | | | | |
| | Strontium acetate | 20 | ⎭ B/2nd chamber | 18 | | | | | | | | | | |
| | Sodium acetate | 10 | B/1st chamber | 9 | | | | | | | | | | |
| 16 | Magnesium acetate | 100 | ⎫ A | 99 | Triethyl phosphate | 50 | A | 100 | | 1.50 | 6.01 | 70 | 0.147 | 0.1 |
| | Manganese acetate | 25 | ⎬ B/1st chamber | 25 | Triethyl phosphate | 75 | B/1st chamber | | | | | | | |
| | Cobalt acetate | 20 | ⎭ | 19 | | | | | | | | | | |
| | Sodium acetate | 15 | B/2nd chamber | 15 | | | | | | | | | | |

Note:
*1A: first reactor; B: second reactor.
*2contents solubilized in polymer.

What is claimed is:

1. A polyester having an initial accumulation electric charge of not less than 2.9 μc/mm² when determined in a melt state according to the method comprising the following steps:
   placing a polyester sample between two parallel electrodes separated by a distance of 1 cm, said two electrodes being maintained at 275° C. in a constant temperature chamber;
   applying a voltage of 1200 V to said sample from a voltage source through a switch circuit which is opened or closed depending on a signal from a data treating device for a period of three minutes;
   detecting resultant voltage and current values;
   plotting the variation of the current value as a function of time on a graph;
   calculating from the region (a) as shown in FIG. 2 the area bordered by the abscissa time value of 0.5 seconds and the abcissa time value corresponding to the initial current value to obtain an area value;
   dividing said area value by the area of said electrodes to obtain the value of the initial accumulation electric charge.

2. The polyester according to claim 1, which has a heat resistance of not more than 0.210 when determined according to the method comprising the steps of:
   admitting said polyester into a region having a nitrogen pressure of 100 mmHg;
   sealing said region;
   heating said polyester at 300° C. for two hours under a nitrogen pressure of 100 mmHg; and
   measuring the change in intrinsic viscosity between the intrinsic viscosity at 30° C. and 300° C. to obtain the heat resistance value.

3. The polyester according to claim 2, which comprises at least one magnesium compound and at least one phosphorus compound solubilized therein in amounts satisfying the following formulas:

$$30 \leq [Mg] \leq 400 \quad (1)$$

$$0.8 \leq Mg/P \leq 3 \quad (2)$$

wherein [Mg] is the content (ppm) of the magnesium compound in terms of magnesium atoms to the polyester and Mg/P is the atomic raio of the magnesium atoms in the magnesium compound to the phosphorus atoms in the phosphorus compound.

4. The polyester according to claim 3, which comprises at least one alkali metal compound solubilized therein, the alkali metal atoms in said alkali metal compound being chosen from sodium atom and potassium atoms, in an amount satisfying the following formula:

$$3 \leq [M_1] \leq 50 \quad (3)$$

wherein [M₁] is the content (ppm) of the alkali metal compound in terms of alkali metal atoms to the polyester.

5. The polyester according to claim 3, which comprises at least one cobalt compound and at least one phosphorus compound solubilized therein in amounts satisfying the following formulas:

$$3.0 \leq [Co] \leq 50 \quad (4)$$

$$0.8 \leq (Mg+Co)/F \leq 3 \quad (5)$$

wherein [Co] is the content (ppm) of the cobalt compound in terms of cobalt atoms to the polyester and (Mg+Co)/P is the atomic ratio of the magnesium atoms in the magnesium compound plus the cobalt atoms in the cobalt compound to the phosphorus atoms in the phosphorus compound.

6. The polyester according to claim 3, which comprises at leat one alkaline earth metal compound and at least one phosphorus compound solubilized therein, the alkaline earth metal atoms in said alkaline earth metal compound being chosen from calcium atoms, strontium atoms and barium atoms, in amounts satisfying the following formulas:

$$30 \leq [Mg] + [M_2] \leq 400 \quad (6)$$

$$2 \leq Mg/M_2 \leq 100 \quad (7)$$

$$0.8 \leq (Mg+M_2)/P \leq 3 \quad (8)$$

wherein [Mg] is the content (ppm) of the magnesium compound in terms of magnesium atoms to the polyester and [M₂] is the content (ppm) of the alkaline earth metal compound in terms of alkaline earth metal atoms to the polyester, Mg/M₂ is the atomic ratio of the magnesium atoms in the magnesium compound to the alkaline earth metal atoms in the alkaline earth metal compound and (Mg+M₂)/P is the atomic ratio of the magnesium atoms in the magnesium compound plus the alkaline earth metal atoms in the alkaline earth metal compound to the phosphorus atoms in the phosphorus compound.

7. The polyester according to claim 6, which comprises at least one cobalt compound and at least one phosphorus compound solubilized therein in amounts satisfying the following formulas:

$$3.0 \leq [Co] \leq 50 \quad (9)$$

$$0.8 \leq (Mg+M_2+Co)/P \leq 3 \quad (10)$$

wherein [Co] is the content (ppm) of the cobalt compound in terms of cobalt atoms to the polyester and (Mg+M₂+Co)/P is the atomic ratio of the magnesium atoms in the magnesium compound plus the alkaline earth metal atoms in the alkaline earth metal compound plus the cobalt atoms in the cobalt compound to the phosphorus atoms in the phosphorus compound.

8. The polyester according to claim 3, which comprises at least one zirconium compound and at least one phosphorus compound solubilized therein in amounts satisfying the following formulas:

$$3.0 \leq [Zr] \leq 19 \quad (11)$$

$$0.8 \leq (Mg+Zr)/P \leq 3 \quad (12)$$

wherein [Zr] is the content (ppm) of the zirconium compound in terms of zirconium atoms to the polyester and (Mg+Zr)/P is the atomic ratio of the magnesium atoms in the magnesium compound plus the zirconium atoms in the zirconium compound to the phosphorus atoms in the phosphorus compound.

9. The polyester according to claim 5, which comprises at least one zirconium compound and at least one phosphorus compound solubilized therein in amounts satisfying the following formulas:

$$3.0 \leq [Zr] \leq 19 \quad (13)$$

$$0.8 \leq (Mg+Co+Zr)/P \leq 3 \quad (14)$$

wherein [Zr] is the content (ppm) of the zirconium compound in terms of zirconium atoms to the polyester and (Mg+Co+Zr)/P is the atomic ratio of the magnesium atoms in the magnesium compound plus the cobalt atoms in the cobalt compound plus the zirconium atoms in the zirconium compound to the phosphorus atoms in the phosphorus compound.

10. The polyester according to claim 6, which comprises at least one zirconium compound and at least one phosphorus compound solubilized therein in amounts satisfying the following formulas:

$$3.0 \leq [Zr] \leq 19 \quad (15)$$

$$0.8 \leq (Mg+M_2+Zr)/P \leq 3 \quad (6)$$

wherein [Zr] is the content (ppm) of the zirconium compound in terms of zirconium atoms to the polyester and $(Mg+M_2+Zr)/P$ is the atomic ratio of the magnesium atoms in the magnesium compound plus the alkaline earth metal atoms in the alkaline earth metal compound plus the zirconium atoms in the zirconium compound to the phosphorus atoms in the phosphorus compound.

11. The polyester according to claim 7, which comprises at least one zirconium compound and at least one phosphorus compound solubilized therein in amounts satisfying the following formulas:

$$3.0 \leq [Zr] \leq 19 \quad (17)$$

$$0.8 \leq (Mg+M_2+Co+Zr)/P \leq 3 \quad (18)$$

wherein [Zr] is the content (ppm) of the zirconium compound in terms of zirconium atoms to the polyester and $(Mg+M_2+Co+Zr)/P$ is the atomic ratio of the magnesium atoms in the magnesium compound plus the alkaline earth metal atoms in the alkaline earth metal compound plus the cobalt atoms in the cobalt compound plus the zirconium atoms in the zirconium compound to the phosphorus atoms in the phosphorus compound.

12. The polyester according to claim 3, which comprises at least one metal compound and at least one phosphorus compound solubilized therein, the metal atoms in said metal compound being chosen from manganese and zinc, in amounts satisfying the following formulas:

$$30 \leq [Mg]+[M_3] \leq 400 \quad (19)$$

$$2 \leq Mg/M_3 \leq 100 \quad (20)$$

$$0.8 \leq (Mg+M_3)/P \leq 3 \quad (21)$$

wherein [Mg] is the content (ppm) of the magnesium compound in terms of magnesium atoms to the polyester and [M_3] is the content (ppm) of the metal compound in terms of metal atoms to the polyester, $Mg/M_3$ is the atomic ratio of the magnesium atoms in the magnesium compound to the metal atoms in the metal compound and $(Mg+M_3)/P$ is the atomic ratio of the magnesium atoms in the magnesium compound plus the metal atoms in the metal compound to the phosphorus atoms in the phosphorus compound.

13. The polyester according to claim 5, which comprises at least one metal compound and at least one phosphorus compound solubilized therein, the metal atoms in said metal compound being chosen from manganese and zinc, in amounts satisfying the following formulas:

$$30 \leq [Mg]+[M_3] \leq 400 \quad (22)$$

$$2 \leq Mg/M_3 \leq 100 \quad (23)$$

$$0.8 \leq (Mg+Co+M_3)/P \leq 3 \quad (24)$$

wherein [Mg] is the content (ppm) of the magnesium compound in terms of magnesium atoms to the polyester and [M_3] is the content (ppm) of the metal compound in terms of metal atoms to the polyester, $Mg/M_3$ is the atomic ratio of the magnesium atoms in the magnesium compound to the metal atoms in the metal compound and $(Mg+Co+M_3)/P$ is the atomic ratio of the magnesium atoms in the magnesium compound plus the cobalt atoms in the cobalt compound plus the metal atoms in the metal compound to the phosphorus atoms in the phosphorus compound.

14. The polyester according to claim 6, which comprises at least one metal compound at at least one phosphorus compound solubilized therein, the metal atom in said metal compound being chosen from manganese and zinc, in amounts satisfying the following formulas:

$$30 \leq [Mg]+[M_2]+[M_3] \leq 400 \quad (25)$$
$$2 \leq Mg/M_3 \leq 100 \quad (26)$$

$$0.8 \leq (Mg+M_2+M_3)/P \leq 3 \quad (27)$$

wherein [Mg] is the content (ppm) of the magnesium compound in terms of magnesium atoms to the polyester, [M_2] is the content (ppm) of the alkaline earth metal compound in terms of alkaline earth metal atoms and [M_3] is the content (ppm) of the metal compound in terms of metal atoms, $Mg/M_3$ is the atomic ratio of the magnesium atoms in the magnesium compound to the metal atoms in the metal compound and $(Mg+M_2+M_3)/P$ is the atomic ratio of the magnesium atoms in the magnesium compound plus the alkaline earth metal atoms in the alkaline earth metal compound plus the metal atoms in the metal compound to the phosphorus atoms in the phosphorus compound.

15. The polyester according to claim 3, wherein the phosphorus compound is the one as added in two or more times to the reaction system in the course of production of the polyester.

* * * * *